(12) United States Patent
Eromäki (10) Patent No.: US 8,113,250 B2
(45) Date of Patent: *Feb. 14, 2012

(54) TIRE WITH QUADRANGULAR STUDS

(75) Inventor: Pentti Juhani Eromäki, Nokia (FI)

(73) Assignee: Nokian Tyres PLC, Nokia (FI)

( * ) Notice: Subject to any disclaimer, the term of this patent is extended or adjusted under 35 U.S.C. 154(b) by 969 days.

This patent is subject to a terminal disclaimer.

(21) Appl. No.: 11/980,106

(22) Filed: Oct. 29, 2007

(65) Prior Publication Data

US 2008/0060733 A1    Mar. 13, 2008

Related U.S. Application Data

(63) Continuation of application No. 11/598,890, filed on Nov. 13, 2006, now Pat. No. 7,900,669, which is a continuation of application No. 10/704,217, filed on Nov. 4, 2003, now abandoned.

(30) Foreign Application Priority Data

Nov. 4, 2002   (FI) ..................................... 20021966

(51) Int. Cl.
*B60C 11/16*    (2006.01)
(52) U.S. Cl. ........................................ 152/210
(58) Field of Classification Search .................... 152/210
See application file for complete search history.

(56) References Cited

U.S. PATENT DOCUMENTS

| | | |
|---|---|---|
| 3,230,997 A | 1/1966 | Carlstedt |
| 3,348,291 A | 10/1967 | Niedzwiecki |
| 3,385,742 A | 5/1968 | Pettersson |
| 3,428,105 A | 2/1969 | Grotsch |
| 3,507,031 A | 4/1970 | Rebold |
| 3,827,885 A | 8/1974 | Baum |
| 3,842,880 A | 10/1974 | Keinanen |
| 4,108,230 A | 8/1978 | Bond |
| 4,128,933 A | 12/1978 | Walrave |
| 6,374,886 B1 | 4/2002 | Eromäki |
| 7,900,669 B2 * | 3/2011 | Eromaki ................ 152/210 |
| 2002/0050312 A1 | 5/2002 | Ostrovskis |
| 2004/0163746 A1 | 8/2004 | Eromäki |

FOREIGN PATENT DOCUMENTS

| | | |
|---|---|---|
| DE | 1 202 156 | 9/1965 |
| DE | 1605598 | 1/1970 |
| DE | 1 903 668 | 8/1970 |
| DE | 23 42 743 | 6/1975 |

(Continued)

OTHER PUBLICATIONS

Translation for WO 99/56976 (no date).*

(Continued)

*Primary Examiner* — Steven D Maki
(74) *Attorney, Agent, or Firm* — Klarquist Sparkman, LLP (57) ABSTRACT

Described herein are several embodiments of an anti-skid stud for insertion into the rubber tread of an air-filled vehicle tire. The stud can include a body that has a bottom flange, a shank element that extends outwardly from the bottom flange, and a hard cermet piece made from a material different than the body. The hard cermet piece is positioned at least partially within the body. The bottom flange can have a substantially quadrangular shape that defines diagonal dimensions. The hard cermet piece can be substantially lozenge-shaped in cross-section and define mutually different diagonal dimensions that extend in a direction perpendicular to a total length of the stud.

8 Claims, 3 Drawing Sheets

FOREIGN PATENT DOCUMENTS

| | | |
|---|---|---|
| DE | 3913450 A1 | 10/1990 |
| FI | 1764/63 | 12/1969 |
| FI | 861/64 | 4/1970 |
| FI | 76962 B | 9/1988 |
| FR | 447945 A | 1/1912 |
| JP | 58-012806 * | 1/1983 |
| JP | 58-101806 * | 6/1983 |
| JP | 63-242703 | 10/1998 |
| WO | 99/56976 * | 11/1999 |
| WO | WO 99/56976 | 11/1999 |

OTHER PUBLICATIONS

Search Report, for corresponding Finnish Patent Application No. 20070289.

* cited by examiner

TIRE WITH QUADRANGULAR STUDS

CROSS REFERENCE TO RELATED APPLICATIONS

The present application is a continuation of U.S. patent application Ser. No. 11/598,890, filed Nov. 13, 2006 now U.S. Pat. No. 7,900,669, which is a continuation of U.S. patent application Ser. No. 10/704,217, filed Nov. 4, 2003 now abandoned, which claims the benefit under 35 U.S.C. §119 of the earlier filing date of Finnish Application No. 20021966, filed on Nov. 4, 2002, all of which are incorporated herein by reference in their entirety.

The invention relates to an anti-skid stud that comprises a body with a bottom flange and a shank element that extends outwardly thereof, and a quadrangular hard cermet piece located inside the body that is made of a different material than the body. The hard cermet piece also has diagonal cermet dimensions in a direction perpendicular to a total length of the stud. The invention also relates to a studded air-filled vehicle tire that has a rolling direction and a rubber tread with pattern blocks and grooves that separate the blocks. The tire also includes anti-slip studs in the tread. The studs include a body that has a bottom flange and a shank element that extends outward from the bottom flange. The studs also include an outer head that has a polygonal contact surface.

BACKGROUND

The publication JP-58-012806 describes a completely ceramic spike for winter tires. The spike is a polygon in cross-section, with the contact surface of the spike tip being particularly polygonal. According to the drawings of the publication, the contact surface of the spike tip is either a sharp-angled quadrangle or an octagon. The spike also includes a bottom flange made of the same ceramic material, with the same shape as the respective shape of the contact surface of the tip.

According to the publication JP-58-012806, the disclosed design is chosen primarily because of the manufacturing technique. But, it is maintained that the strength and grip of the spike are also improved in comparison with a spike that is round in cross-section, but otherwise has the same type of structure. In the publication JP-58-012806, the spike material is mainly composed of aluminum oxide $Al_2O_3$, and the durability of this type of material is not sufficient in practice. This type of spike is strongly inclined when driving, particularly if the tire tread is made of a relatively soft rubber, as is the trend nowadays, which means that the grip is remarkably reduced and the spikes may even become detached. If a spike of this type is made of a sufficiently hard, impact-resistant and wear-resistant hard metal, the weight of the anti-slip element becomes remarkably heavy, which means that the wearing of the road surface is intensive and the rubber tread of the tire is easily damaged. The design according to the publication JP-58-012806 makes it difficult to install spikes by automatic devices. The design also results in a swift tearing of the tire tread in the vicinity of the spike when driving, which, as a consequence, can cause the spikes to fall off.

The publication DE-1 202 156 and U.S. Pat. No. 3,230,997 each disclose an anti-skid spike that includes a circular body made from, for example, steel, aluminum or plastic, and a piece of sintered carbide arranged inside the body. The piece of sintered carbide has the form of a square. According to the publications, the reason for using the quadratic form is to improve the fixing of the sintered carbide piece inside the body.

The publication WO-99/56976 discloses an anti-skid spike with a hard cermet piece that has a geometric cross-sectional shape, a limited number of symmetry levels and a changing cross-sectional area from the outer head to the inner head such that the hard cermet piece expands towards the bottom flange of the spike. The publication mentions several different cross-sectional shapes of the hard cermet piece, such as a triangle, a rectangle, an ellipse, a semi rectangle, a semicircle, a quadrangle, and an octagon, with all such shapes particularly equal in significance.

As regards the shape of the bottom flange of the anti-skid spike disclosed in WO-99/56976, it is only said that it may be asymmetrical with respect to one lengthwise plane with a length and a width that are mutually different. According to the drawings of the publication, the bottom flange includes two opposite straight sides, either in parallel or at a sharp angle with respect to each other. It is also mentioned that intermediate shapes between these two are possible, but the specification does not offer a more detailed description, only a general remark. Neither of the shapes of the sides of the bottom flange are quadrangles.

The publication WO-99/56976 also recommends the use of a rib in the lengthwise direction of the spike, but without a top bowl. Further, as shown in the drawings, the longer dimension of the bottom flange of the publication WO-99/56976 can be positioned either in the circumferential direction of the tire, in which case it is suited to urban driving as described in the publication, or perpendicular to the circumferential direction, in which case it is suited to driving on country roads as described in the publication.

The publication DE-23 42 743 describes an ice stud designed for winter tires of vehicles, wherein the ice stud comprises an element made of one material and is rectangular in cross-section. The shape of the ice stud is the same along the whole length of the anti-slip element. This kind of stud goes easily deeper in the tire and tends to incline excessively during speed and/or direction changes, which results in a weak grip on a slippery road surface. These kinds of ice studs can easily detach from the tire tread during usage. As the only objective of the invention, the publication mentions a decrease in the wearing of the road surface.

The publication US 2002/0050312 discloses a studded winter tire, where the stud has an elongate bottom part with a shape other than round, and the shape has a lengthwise axis and an elongate top part other than round. The shape of the bottom part and top part of the stud is nearly an ellipse, or an oblong shape resembling an ellipse. In the middle of the tire rolling surface, the lengthwise axes of the top parts of the studs are in a position parallel to the tire axis, and the lengthwise axes of the bottom parts of the studs are arranged in the circumferential direction of the tire.

SUMMARY

As will be described in more detail below, disclosed herein are embodiments of an air-filled vehicle tire provided with anti-slip studs that facilitate an excellent grip on a slippery road surface and should not have a tendency to fall off even during intensive acceleration and/or braking.

According to some embodiments, a tire with anti-slip studs is disclosed that would have an optimal wear resistance.

According to yet some embodiments, a tire with anti-slip studs can be studded by automatic studding machines in a process that is as free of errors as possible.

In some embodiments, a tire can have stud holes made to be ready for use as holes or otherwise by conventional and effective production methods. The stud holes can then be used to install studs that in cross-section are other than round. The studs can be orientated according to the needs of the situation, i.e. certain directions of the cross-sectional shape of the studs could be in certain predetermined positions with respect to the circumferential direction or axial direction of the tire.

The above described problems are solved and the above defined advantages realized by a vehicle tire provided with the various embodiments of an anti-slip stud and anti-slip studded tire as described herein.

More specifically, according to a first embodiment, an anti-skid stud for insertion into the rubber tread of an air-filled vehicle tire can include an inner head and an outer head with a total length between the inner and outer heads. The anti-skid stud includes a body with a bottom flange and a shank element that extends outwardly from the bottom flange. The bottom flange has a substantially quadrangular shape with diagonal flange dimensions extending in directions perpendicular to the total length. The anti-skid stud also includes a hard cermet piece made of a different material than the body. The hard cermet piece is located inside the body and protrudes out of the outer head. The hard cermet piece is substantially lozenge-shaped in cross-section with mutually different diagonal dimensions that extend in a direction perpendicular to the total length.

According to a second embodiment, a studded air-filled vehicle tire has one rolling direction and a rubber tread. The rubber tread includes pattern blocks and grooves that separate the blocks. Further, premade stud holes are formed in the rubber tread. The tire includes anti-slip studs in at least some of the premade stud holes. The anti-slip studs have a total length and include a body with a bottom flange and a shank element that extends outwardly from the bottom flange. The bottom flange has a quadrangular shape with diagonal flange dimensions extending in directions perpendicular to the total length. The anti-skid stud also includes a hard cermet piece made of a different material than the body. The hard cermet piece is located inside the body and is substantially lozenge-shaped in cross-section with mutually different diagonal dimensions that extend in a direction perpendicular to the total length. At least some of the anti-slip studs in the premade stud holes are oriented such that one of the diagonal dimensions of the hard cermet piece of each of said at least some anti-slip studs is substantially parallel to the rolling direction or forms a toe-out angle with the rolling direction that is less than approximately 30°.

It has now been surprisingly found out that (i) by replacing the traditionally cylindrical hard cermet tip of an anti-slip stud with a hard cermet piece that is lozenge-shaped in cross-section; (ii) by replacing the traditionally round bottom flange of the stud with a quadrangular, e.g., lozenge-shaped, bottom flange; and (iii) by arranging the stud in the vehicle tire tread so that one diagonal of the hard cermet piece that is lozenge-shaped in cross-section is substantially arranged in the circumferential direction of the tire, the grip of the studded tire is clearly improved in comparison with tires that are provided with a conventional stud having a round hard cermet piece. This is because the stud tips of the present disclosure make a wider adhesion groove in an icy surface or the like than conventional studs. These advantages are realized without increasing the weight of the anti-slip studs in comparison with prior art studs.

Likewise, it has surprisingly been discovered that by replacing the traditionally round bottom flange of the stud body by a bottom flange that is quadrangular in the direction perpendicular to the stud length, the studs are easily and without difficulty adjusted in the tire stud holes by automatic installation machines provided with four jaw fingers or even with only three jaw fingers. Moreover, the studs are easily and without difficulty adjusted in a desired orientation with respect to the circumferential direction of the tire or the axial direction of the tire, for instance in the above described diagonal circumferential direction.

In certain embodiments, the studs can provide one or more of the following additional advantages: (i) the inclination of the anti-slip studs is reduced under the holding forces because the flange, i.e. the diagonal, is longer in the direction of a possible inclination; (ii) the turning of the anti-slip studs is reduced; and (iii) the wearing of the tire rubber is reduced. In specific implementations of a stud having a relatively wide top bowl in the stud shank, which top bowl is preferably separated from the bottom flange by a neck portion, the inclination of the stud is further reduced.

The foregoing and other features and advantages of the embodiments of the present disclosure will become more apparent from the following detailed description, which proceeds with reference to the accompanying figures.

BRIEF DESCRIPTION OF THE DRAWINGS

FIGS. 11A and 11B illustrate respective embodiments of a stud hole having an oval part and arranged in the studded tire. The oval part is positioned with respect to the circumferential direction of the tire. In FIG. 11A, the stud hole is positioned in the vicinity of the tire shoulders, e.g., at points I and III of FIG. 4, and in FIG. 11B, the stud hole is positioned nearer to the center regions of the tire width, e.g., at points II of FIG. 4.

DETAILED DESCRIPTION

Figure 4:
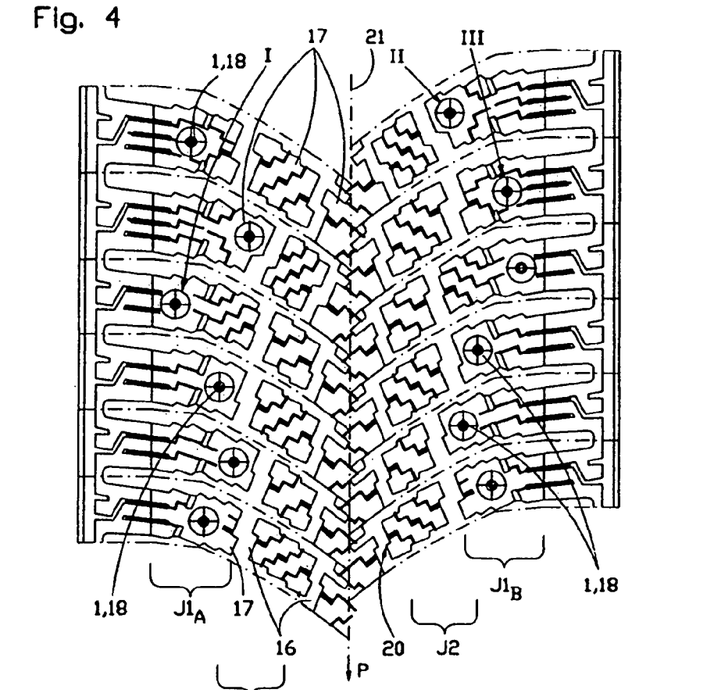
FIG. 4 is a general illustration of the tread of an air-filled vehicle tire showing positions of anti-slip studs as seen from the outside of the tire and a direction corresponding to direction V as indicated in FIGS. 5, 12A, 12B and 13A.

FIG. 4 illustrates a typical tread pattern of a studded, air filled vehicle tire. The air-filled vehicle tire comprises, among other things, a tire housing (not illustrated), a tread 20 made of rubber and stud holes 18 in the tread created during the vulcanization of the tire, and anti-slip studs 1 in at least some of the stud holes. As is well known, in the tread 20, also called the wear surface, there are grooves 16 and pattern blocks 17. The anti-slip studs are typically attached in the pattern blocks. The pattern blocks can also have fine grooves, but because the invention does not relate to the tread as such, the design of the tread is not explained in more detail. For an optimal holding capacity of the tire, the hardness of the rubber quality in the tread 20 is relatively low, advantageously of the order 55-60 Shore A. The studded tire illustrated in FIG. 4 has a given rolling direction P, but anti-slip studs according to the invention can also be arranged in tires with a rolling direction that is either one of the opposite circumferential directions, as shall be explained in more detail below.

Figure 5:
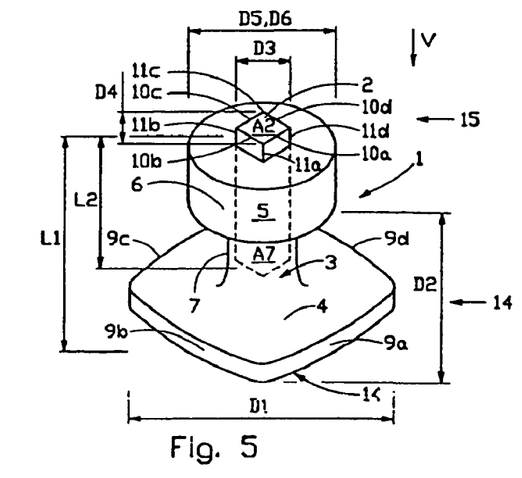
FIG. 5 illustrates an axonometric view of another embodiment of an anti-slip stud for use in a studded tire and having a quadrangular hard cermet piece and bottom flange.

Referring to FIG. 5, the anti-slip studs 1 arranged in the tread have an inner head 14, i.e. a head that points towards the axial line of the tire and is set deeper in the tread 20, an outer head 15, i.e. a head that is set in the region of the outer surface of the tire tread or in the vicinity of the region, and a total length L1 extending from the inner head and the outer head. Each of the anti-slip studs comprises a body 3 provided with a bottom flange 4 and a shank element 5 pointing outwards of the body.

Figure 13A:
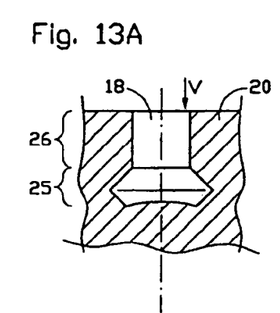
FIG. 13A illustrates a longitudinal cross-section of another embodiment of a stud hole having round parts taken along a vertical plane. The stud hole can be arranged in the studded tire at various locations on the tire, e.g., at points I, II and III of FIG. 4.
Figure 13B:
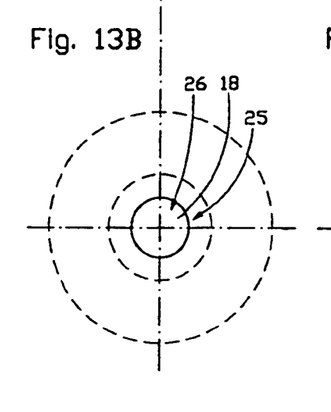
FIG. 13B illustrates a top plan view of the stud hole of FIG. 13A.
Figures 14, 15:
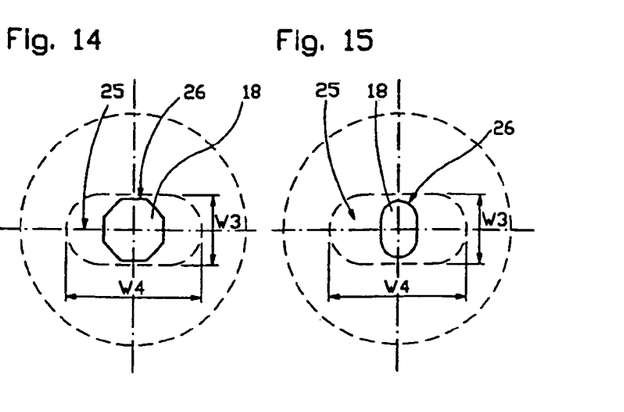
FIGS. 14 and 15 each illustrate a top plan view of a respective one of two other embodiments of a stud hole having an oval bottom shape and respective top parts having the shapes shown.

Referring now to FIGS. 13A and 13B, the premade stud holes 18 arranged in the tread 20 can, according to one embodiment, be substantially circular in cross-section. In such an embodiment, typically both the bottom part 25 of the stud hole, in which bottom part the bottom flange 4 of the anti-slip stud is set, is round, and also the top part 26 of the stud hole, in which the top bowl 6 of the anti-slip stud is set, is round. In other embodiments, the cross-sectional shape of the top part 26 is other than round (see FIGS. 14 and 15).

Figure 11A:
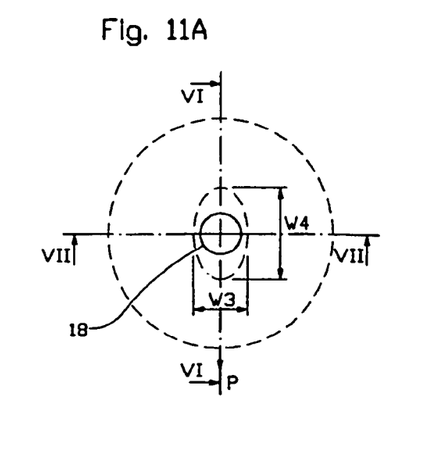
Figure 11B:
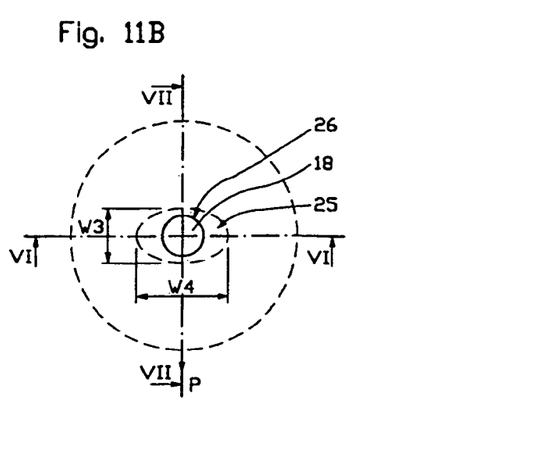
Figure 12A:
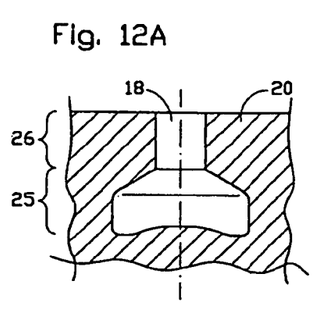
FIG. 12A illustrates a longitudinal cross-section of either the stud hole of FIG. 11A or FIG. 11B as seen along the plane VI-VI shown in FIGS. 11A and 11B.
Figure 12B:
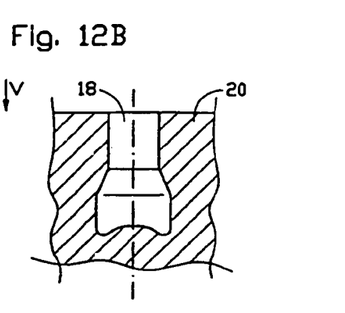
FIG. 12B illustrates a longitudinal cross-section of either the stud hole of FIG. 11A or FIG. 11B as seen along the plane VII-VII shown in FIGS. 11A and 11B.

Referring now to FIGS. 11A, 11B, 12A and 12B, according to another embodiment, the premade stud holes 18 of the tread 20 can have a bottom part 25 that is oval or elongate in cross-section. The oval shape has a larger transverse dimension W4 and a smaller transverse dimension W3 in directions that are perpendicular to the depthwise direction of the hole, i.e., the direction of the stud total length L1. Some stud holes according to this embodiment can belong to a first group $J1_A$ and/or $J1_B$ of stud holes located nearer to the tire shoulders and formed in the tread of the tire such that the larger transverse dimension W4 of the oval bottom part 25 of each of the stud holes 18 are substantially in parallel with the tire rolling direction P, as is shown in FIG. 11A. Some other stud holes according to this embodiment can belong to a second group J2 of stud holes located nearer the center regions of the tire and formed in the tread of the tire such that the larger transverse dimension W4 of the oval bottom parts 25 of the stud holes 18 are substantially perpendicular to the tire rolling direction P, as is shown in FIG. 11B.

Similarly, the short transverse dimension W3 of the oval bottom part of each of the stud holes in the vicinity of the tire shoulders, e.g., the stud hole 18 shown in FIG. 11A, is substantially parallel with the axial line of the tire. The short transverse dimension W3 of the oval bottom part of each of the stud holes in the tire regions located in the center parts of the tire width, e.g., the stud hole 18 shown in FIG. 11B, is substantially parallel with the rolling direction P.

In some embodiments, the ratio of the longer transverse dimension W4 of the bottom part 25 to the shorter transverse dimension W3, i.e. W4:W3, is at least 1.05, but not more than 2.

The cross-sectional area $A_H$ of the stud holes is smaller than the cross-sectional area of the studs. More precisely, the cross-sectional area of the bottom part 25 of the stud holes is smaller than a cross-sectional area A4 of the bottom flange 4 of the anti-slip studs, and the cross-sectional area of the top part 26 of the stud holes is smaller than a cross-sectional area A6 of the top bowl 6 of the anti-slip studs. Accordingly, the anti-slip studs 1 are set tightly in the holes 18.

Referring back to FIG. 5, the top bowl 6 of the body 3 of the anti-slip stud 1 has transverse dimensions D5, D6 perpendicular to the length of the anti-slip stud and a top bowl cross-sectional area A6 that is perpendicular to the length L1. The top bowl 6 may have a round shape as viewed perpendicular to said length of the anti-slip stud. In some implementations, as shown in FIG. 5, the transverse dimensions D5 and D6 are equally large. In other implementations, the top bowl 6 has an oblong shape such that the transverse dimensions D5 and D6 are unequal, or the top bowl has a polygonal shape such that the transverse dimensions D5 and D6 are equally large or not equally large.

A neck portion 7 is arranged between the top bowl 6 and the bottom flange 4. The neck portion 7 has a cross-sectional area A7 perpendicular to the length L1 of the anti-slip stud that is substantially smaller than the cross-sectional area A6 of the top bowl 6 and the cross-sectional area A4 of the bottom flange 4. The neck portion 7 clearly separates the top bowl 6 from the bottom flange 4.

Each anti-slip stud 1 comprises a hard cermet piece 2 made of a different material than the body 3. The hard cermet piece 2 is placed inside the body 3 and protrudes out of the body's outer head 15. The hard cermet piece 2 also has a substantially quadrangular shape in a direction perpendicular to the stud length L1.

The typical length L1 of the studs for passenger car tires is between 10 mm and 11 mm, for delivery van tires between 11 mm and 13 mm, for truck tires between 14 mm and 17 mm. and for tires for heavy machinery, such as loaders, road machines etc., between 17 mm and 20 mm. The rubber surrounding the stud body 3 in the tread 20 supports the stud and holds it in the right position, i.e. substantially perpendicular to the tread rolling surface.

Figure 1A:
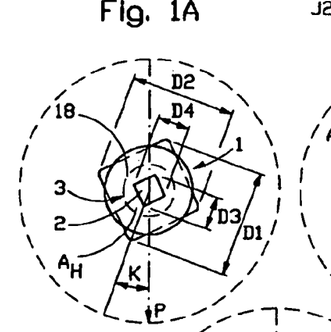
FIGS. 1A and 3A illustrate respective embodiments of anti-slip studs at two orientations with each stud having a quadrangular hard cermet piece and bottom flange. The stud of FIG. 1A is positioned on the tire in the vicinity of the first shoulder, e.g., at point I of FIG. 4, and the stud of FIG. 3A is positioned on the tire in the vicinity of the second tire shoulder, e.g., at point III of FIG. 4. The embodiments of the orientations are realized by using a second installation method as will be described in more detail.
Figure 1B:
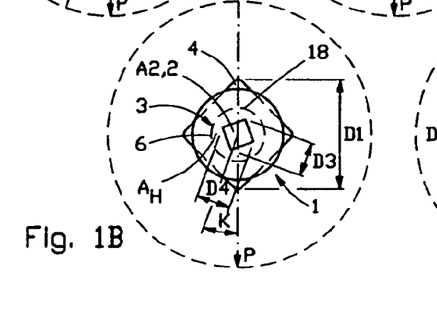
FIGS. 1B and 3B illustrate respective embodiments of anti-slip studs at two orientations with each stud having a quadrangular hard cermet piece and bottom flange. The stud of FIG. 1B is positioned on the tire in the vicinity of the first shoulder, e.g., at point I of FIG. 4, and the stud of FIG. 3B is positioned on the tire in the vicinity of the second tire shoulder, e.g., at point III of FIG. 4. The embodiments of the orientations are realized by using a first installation method as will be described in more detail.
Figure 2:
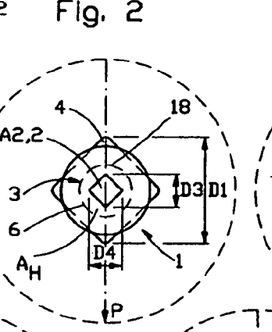
FIG. 2 illustrates an embodiment of an anti-slip stud at a particular orientation with the stud having a quadrangular hard cermet piece and bottom flange. The stud of FIG. 2 can be positioned on the tire nearer to the center regions of the tire width than at points I and III of FIG. 4, e.g., at point II of FIG. 4. Alternatively, the anti-slip stud of FIG. 2 can be positioned on the tire at various other regions of the tire width, such as, for example, at points I and III of FIG. 4.

The quadrangular hard cermet piece has diagonal dimensions D3 and D4 in a direction perpendicular to the stud length L1. At least part of the anti-slip studs 1 inserted in the premade stud holes 18 are orientated so that one of the diagonal dimensions D3 or D4 of the hard cermet piece is located in the tire rolling direction P, as shown in FIG. 2, or forms an angle that is not larger than a toe-out angle K with said rolling direction P, as shown in FIGS. 1A, 1B, 3A, and 3B. It should be understood that the studs 1 can, according to the needs of the situation, be installed in either all of the stud holes 18 arranged in the tread 20, or only in part of the stud holes. Likewise, it should be understood that each anti-slip stud 1 installed in the tread 20 is orientated either (1) so that the diagonal dimensions D3, D4 of the hard cermet pieces are located in said rolling direction P; (2) so that they form, with respect to said direction, an angle that is not larger than the toe-out angle K; or (3) in some other way. According to some embodiments, the toe-out angle K is smaller than 30°. In specific implementations, the toe-out angle K is not larger than 20° and in other implementations, the toe-out angle K is not larger than 15°. In certain implementations, it may be advantageous to use toe-out angles K that are not larger than 10°.

The hard cermet piece 2 is arranged inside the stud body 3. The cermet piece 2 has a length L2 that is smaller than the total length L1 of the anti-slip stud, a cross-sectional area A2 that is smaller than the cross-sectional area A7 of the stud neck portion 7 and substantially smaller than the cross-sectional areas A6 and A4 of the stud top bowl 6 and bottom flange 4, respectively.

Figure 9:
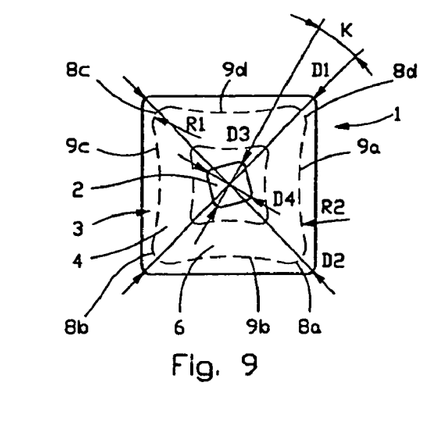
Figure 10:
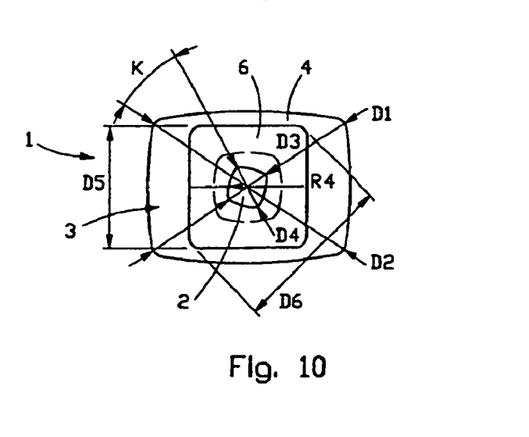

The side surfaces 10a, 10b, 10c, 10d of the quadrangular hard cermet piece 2 can be (1) convex, as shown, for example, in FIG. 10; (2) concave, as shown, for example, in FIG. 8, and have a curvature R4; or (3) straight, as shown, for example, in FIGS. 1A-3B, 5-7 and 9. The above mentioned diagonal dimensions D3, D4 of the hard cermet piece 2 are typically equally large or nearly equally large, such as shown in FIGS. 1A-3B, 5 and 7-10. In such embodiments, the shape of the quadrangular hard cermet piece is mainly a square or a rectangle.

Figure 6:
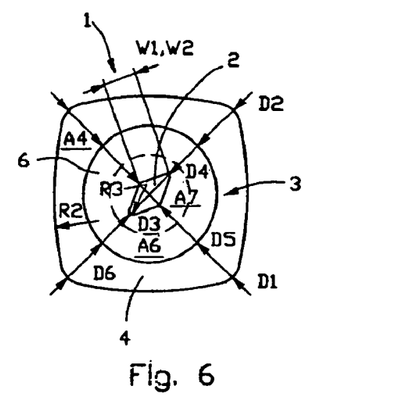
FIGS. 6-10 each illustrate a top plan view of respective embodiments of an anti-slip stud to be used in a studded tire and having a quadrangular hard cermet piece and bottom flange.
Figure 7:
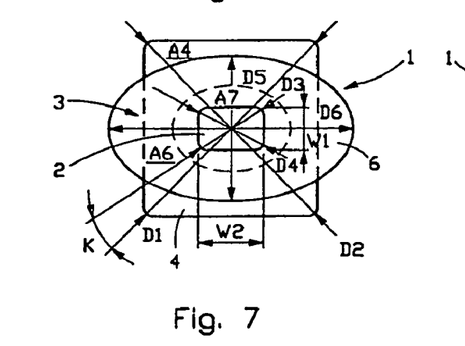
Figure 8:
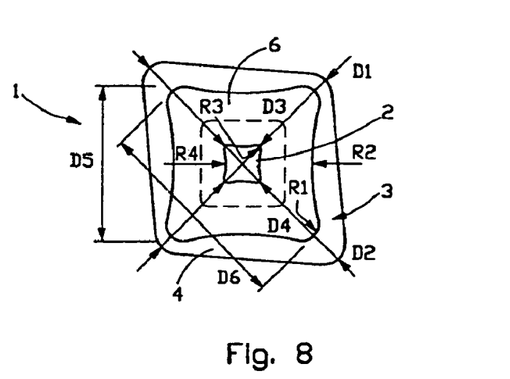

In other embodiments, the diagonal dimensions D3, D4 may also be mutually different, such as shown in FIG. 6, such that the shape of the quadrangular hard cermet piece is mainly a lozenge or a parallelepiped.

The described shape definitions, such as square, rectangle, lozenge and parallelepiped, are also applicable to a cermet piece 2 with sides 10a, 10b, 10c, 10d having curvature R4 as long as the side curvature or radius of curvature R4 is substantially larger than the radius of the circle drawn via the edges, or corners, 11a, 11b, 11c, 11d of the hard cermet piece. In other words, the shape definitions are applicable as long as both of the diagonal dimensions D3 and D4, which pass from an edge of the hard cermet piece to the opposite edge, are larger than all other connecting lines between the opposite sides 10a and 10c, or 10b and 10d of the hard cermet piece that pass through the intersection of the diagonal dimensions D3, D4.

The edges 11a, 11b, 11c, 11d between the side surfaces of the quadrangular hard cermet piece 2 have a rounding R3 that is substantially smaller than the curvature R4. In some embodiments, the rounding R3 is at least 0.1 mm, but no more than 0.2 mm. The rounding can prevent the hard cermet piece from splitting. The side surfaces 10a, 10b, 10c, 10d of the quadrangular hard cermet piece have widths W1, W2 with a mutual difference that is at most the ratio 1.5, in other words, W1:W2≦1.5.

In specific implementations, such as with tires of passenger cars and delivery vans, the cross-sectional area A2 of the hard cermet piece is between 4.5 mm² and 6 mm². For example, with a hard cermet piece having a quadrangular or corresponding shape, the widths W1, W2 can be between 2.1 mm and 2.5 mm and the diagonals can be between 2.9 mm to 3.6 mm. In some implementations, the hard cermet piece can have a rectangular shape with extreme values that somewhat deviate from these. In other implementations, such as with tires of trucks, the cross-sectional area A2 of the hard cermet piece of the anti-slip studs 1 is between 7 mm² and 9 mm², and with tires of heavy machinery, the cross-sectional area A2 is between 9 mm² and 13 mm².

By applying the shape and orientation of the hard cermet piece in the tire as described above, there is achieved an excellent holding capacity for the studded tire in the desired way.

The bottom flange 4 of the anti-slip stud 1 has a substantially quadrangular shape in a direction perpendicular to the length L1 of the stud, diagonal dimensions D1 and D2, and a cross-sectional area A4 in a direction perpendicular to the stud length L1. The diagonal dimensions D1, D2 of the bottom flange 4 can be equally large, such as shown in FIGS. 1A-3B and 5-9, or they can be different in length, such as shown in FIG. 10. In some embodiments, the bottom flange is quadrangular. In other embodiments, the bottom flange has a lozenge shape. In yet other embodiments, the bottom flange has a rectangle shape.

The diagonal dimensions D1, D2 of the bottom flange 4 are either substantially parallel with the diagonal dimensions D3, D4 of the hard cermet piece, such as shown in FIGS. 1A, 2, 3A, 5-6 and 8, or they form a toe-out angle K with respect to the diagonal dimensions D3, D4 of the hard cermet piece, such as shown in FIGS. 1B, 3B, 7 and 9-10. The bottom flange sides 9a, 9b, 9c, 9d can have a curvature R2 and be convex, such as shown in FIGS. 5, 6 and 10, or concave, such as shown in FIG. 9. As an alternative, the bottom flange sides 9a, 9b, 9c, 9d can be straight, such as shown in FIGS. 1A-3B and 7-8.

The above described shape definitions of square, rectangle and lozenge also apply to shapes provided with sides 9a, 9b, 9c, 9d that have a curvature R2, as long as the curvature or radius of curvature R2 of the sides is substantially larger than the radius of a circle drawn through the bottom flange edges 8a, 8b, 8c, 8d (see, e.g., FIG. 9). Thus, both of the above mentioned diagonal dimensions D1 and D2, which pass from the bottom flange edge to the opposite edge, are larger than all other lines connecting the opposite sides 9a and 9c or 9b and 9d of the bottom flange and passing through the intersection of the diagonal dimensions D1, D2.

In addition, the edges 8a, 8b, 8c, 8d left between said sides of the bottom flange have a rounding R1 that is substantially smaller than the curvature R2.

By the shape of the bottom flange as described above, the anti-slip studs are orientated in a desired fashion in the stud holes 18 such that a desired and excellent holding capacity for the studded tire is obtained.

The hard cermet piece is comprised of any sufficiently hard and appropriate known or new, generally sintered metal, such as metal carbides, metal nitrides, metal oxides etc. In some implementations, the hard cermet piece 2 is made of compounds of known, mainly sintered carbides that are typically, but not necessarily, bound by a metal matrix.

The stud body 3 may be made of a known or new suitable metal alloy, such as steel or aluminum, or it may be made of a suitable plastic or composite material. These materials are provided as examples only.

The hard cermet piece 2 can be attached to the body 3 by a solder joint, adhesive, a cast adhesion or a conical pressure joint depending on, among other things, the body material.

According to some embodiments, the location of the diagonal dimensions D3, D4 of the hard cermet pieces in the rolling direction P or at an angle with respect to said rolling direction, which angle is not larger than the toe-out angle K, as described above, is arranged so that one of the diagonal dimensions D1 or D2 of the bottom flange is located in said rolling direction P or forms said toe-out angle K with respect to the rolling direction P. In principle, it is maintained that the number of different orientations of the studs in the tire may be nearly infinite. For example, the toe-out angle K can equal 0°, i.e., when diagonal dimensions D3 or D4 are parallel with the rolling direction P, or equal any of various other possible toe-out angles, such as, for example, K=1°, 2°, 3°, 4° . . . etc. The different orientations of the anti-slip stud with respect to the rolling direction can be realized in many different ways by using the quadrangular shape of the anti-slip stud bottom flange 4 in adjusting the stud position.

According to a first embodiment of a stud installation method, all anti-slip studs used in a given tire are, with regards to the directions or positions of the diagonal dimensions D3, D4 of the hard cermet piece relative to the diagonal dimensions D1, D2 of the bottom flange 4, of the same type. In some implementations, for example, all the studs are of a type where at least one of the diagonal dimensions D3 or D4 of the hard cermet piece is parallel with at least one of the diagonal dimensions D1 or D2 of the bottom flange. More specifically, in certain implementations, both of the diagonal dimensions D3 and D4 of the hard cermet piece are parallel with the corresponding diagonal dimensions D1 and D2 of the bottom flange.

In the first embodiment, the control elements of the installation machine (not shown) are always arranged in such a position, with respect to the tire tread under operation, that the studs 1 are set in a desired orientation. The installation method is apparent from FIGS. 1A, 2, 3A. For example, in the case of FIG. 2, the mutually parallel diagonals D3 and D1 of the studs are located in the tire rolling direction P, and in the case of FIGS. 1A and 3A, both of the mutually parallel diagonals D3 and D1 are turned to opposite toe-out angles K with respect to the rolling direction P. It should be understood that these positions can be achieved by turning the jaws of the installation machine (not shown) in three different positions between which is formed the toe-out angle.

According to a second embodiment of a stud installation method, the anti-slip studs used in a given tire are, with regards to the directions or positions of the diagonal dimensions D3, D4 of the hard cermet piece relative to the diagonal dimensions D1, D2 of the bottom flange 4, of at least two different types. In at least one of the two types, the diagonal dimension D3 and/or D4 of the hard cermet piece forms a toe-out angle K of a predetermined size with the diagonal dimension D1 and/or D2 of the bottom flange.

Figure 3A:
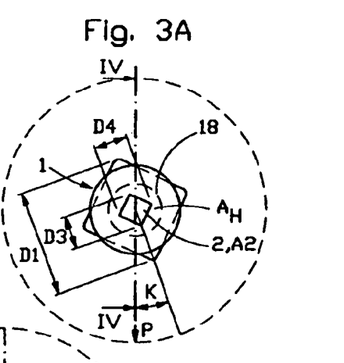
Figure 3B:
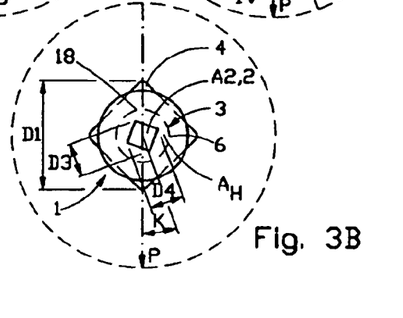

In the second embodiment, the control elements of the installation machine can be arranged in a standard position based on the angle differences between the diagonals of the hard cermet piece and the diagonals of the bottom flange and the corresponding desired toe-out angles K in a finished studded tire. Based on the various regions of the tire tread in which a stud is desirably installed, the desired orientation of the hard cermet piece is obtained by changing the type of the studs to be inserted. The installation method can be understood from FIGS. 1B and 3B. For example, the studding is carried out by using studs of a first type as shown in FIGS. 2 and 5 and studs of a second type as shown in FIGS. 1B and 3B. The toe-out angle K is formed by means of the studs illustrated in FIGS. 1B and 3B and installed according to FIGS. 1B and 3B. The diagonal dimensions D1 and/or D2 of the bottom flange of the studs of the second type are set in the rolling direction P and the diagonals D3 and/or D4 of the hard cermet piece are turned to opposite toe-out angles K with respect to the rolling direction P, such as shown in FIGS. 1B and 3B.

According to one embodiment, the anti-slip studs 1 may be arranged in the tread 20 of a vehicle tire in one position only. For example, all studs are arranged in the position illustrated in FIG. 2, e.g., one of the diagonals D3 or D4 of the hard cermet piece 2 is substantially in parallel with the rolling direction P. However, according to other embodiments, it is more advantageous to arrange the anti-slip studs 1 in the tire tread 20 in various positions, such as in at least two different positions, or in at least three positions, such as three of the positions shown in FIGS. 1A-4. Accordingly, the anti-slip studs arranged on a tire typically constitute at least two first groups $J1_A$ and $J1_B$ nearer to the tire shoulders and at least one second group J2 nearer to the center regions of the tire. In this manner, and when so desired, the studded tire is made symmetrical in the width direction of the tread. It also is possible, however, to use only one first group $J1_A$ or $J1_B$ nearer to one of the tire shoulders and at least one second group J2 nearer to the center regions of the tire and to the opposite shoulder. In this manner, and when so desired, the studded tire is made asymmetrical in the width direction of the tread. It is known in the prior art that the tread pattern proper of the tread 20 may, independent of the studding, be either symmetrical or asymmetrical.

According to some embodiments, one set of the diagonal dimensions D3 or D4 of the hard cermet pieces of the anti-slip studs in the first groups $J1_A$ and $J1_B$ are located at said toe-out angle K with respect to the rolling direction P, such as shown in FIGS. 1A, 1B, 3A, 3B and 4, and one set of the diagonal dimensions D3 or D4 of the hard cermet pieces of the anti-slip studs in the second group J2 are located substantially in parallel with the rolling direction P, such as shown in FIGS. 2 and 4. In any case, the toe-out angles of the cermet pieces of the studs in the second group J2 are smaller than in the first group or groups $J1_A$, $J1_B$.

In some embodiments, with studs in the first groups $J1_A$, $J1_B$, the toe-out angle K of the cermet piece is smaller than the earlier mentioned 30°. In some implementations, the toe-out angle K is not larger than 20°, and in other implementations, the toe-out angle K is not larger than 15°. In certain implementations, the applied toe-out angles K are not larger than 10°.

With studs of in the second group J2, in some embodiments, the toe-out angles K of the cermet piece is smaller than 15°. In some implementations, the toe-out angle K is smaller than 10° and in other implementations, the toe-out angle K approaches the value 0°.

Although not illustrated in the drawings, in some embodiments, third groups can be located between the first and second groups and naturally be interlaced with one or both of the above described groups. The cermet pieces of the studs in the third group can be oriented at intermediate toe-out angles K with respect to the rolling direction P, such as, for example, angles between 10° and 15°.

For tires having a tread pattern that can be arranged to rotate in any direction when mounted to a vehicle, i.e., a tire that has a rolling direction in either one of the two opposite circumferential directions, the toe-out angles K of the studs in the first groups or group can be pointed in any of two directions, i.e., directions outwardly or inwardly from the center line 21 of the tread 20.

On the other hand, for tires having a tread pattern that can be arranged to rotate in only a single given predetermined rolling direction, i.e. a tire that must be arranged in the vehicle so that the rolling direction is always the same when driving forward, a more effective method of forming the toe-out angle can be applied. For example, in the first groups $J1_A$ and $J1_B$, the toe-out angles K of one set of the diagonal dimensions D3 or D4 of the hard cermet pieces are pointed, when seen in the rolling direction P, outwardly from the center line 21 of the width of the tread 20. The toe-out angles K open in the rolling direction P, which points downward in FIGS. 1A, 1B, 3A and 3B, and are defined as the angles between the diagonals D3 or D4 of the hard cermet pieces and the rolling direction P. The toe-out angles K are always located outside the rolling-direction line 22 proceeding from a center line 23 of each anti-slip stud 1, with the toe-out angles K of the studs in group J1$_A$ extending in one direction and the toe-out angles K of the studs in the group J1$_B$ extending in the opposite direction.

In some embodiments, there may be several of stud groups, such as, for example, five stud groups. In such embodiments, the studs 1 belonging to the group that is located nearest to the shoulders can have the widest toe-out angle, the middle group does not have any toe-out angle at all, as was explained above, and the studs 1 belonging to the group or groups therebetween have toe-out angles that are smaller than the studs located near the shoulders. In certain implementations, however, it is possible to arrange the anti-slip studs 1 of the additional groups such that the toe-out angles of the studs are pointed in different directions than what was explained above.

The first stud groups J1$_A$, J1$_B$ and second stud group J2, i.e., those regions of the tire tread that are provided with studs fulfilling said the above-described conditions, can be mutually fully detached or spaced-apart from each other, or the regions can be exactly bordered by each other. In practice, for example, it should be most feasible that the first groups J1$_A$, J1$_B$ are interlaced with respect to the second group J2, such as when these groups are observed in the way indicated in FIG. 4, i.e., as zones in the width direction that are bordered in the width direction by the outermost studs 1 that fulfill the toe-out condition of the studs of the respective group. The toe-out condition is fulfilled if the toe-out angle K has either a given, predetermined value, or the toe-out angle K is within a given, predetermined angle range.

The terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A studded air-filled vehicle tire, having one rolling direction, and comprising a rubber tread with pattern blocks, grooves separating said blocks and premade stud holes in said tread, said tire being provided with anti-slip studs having a total length, said studs being inserted in at least some of said stud holes, each of said studs comprising:
   a body with a bottom flange and a shank element extending outwardly from the bottom flange, said bottom flange having a quadrangular shape with diagonal dimensions perpendicular to said total length and perpendicular to each other, the bottom flange having four sides of equal length; and
   a hard cermet piece made from a different material than said body and positioned at least partially within the body, said hard cermet piece having a substantially quadrangular shape with mutually different diagonal dimensions that extend perpendicular to said total length and perpendicular to each other, the hard cermet piece having four sides of equal length;
   wherein substantially all of the anti-slip studs in the stud holes are orientated so that one of said diagonal dimensions of the hard cermet pieces is substantially parallel to the rolling direction or forms a toe-out angle with respect to the rolling direction that is smaller than 10 degrees.

2. The studded tire of claim 1, wherein one of the diagonal dimensions of the bottom flange of at least some of the studs is substantially parallel to the rolling direction, or (ii) form a toe-out angle with respect to the rolling direction.

3. The studded tire of claim 1, wherein said anti-slip studs comprise at least a first group nearer to the tire shoulders, and at least a second group nearer to the tire center regions, wherein one of the cermet piece diagonal dimensions of each of the studs of the first group define a toe-out angle of less than 10 degrees with respect to said one rolling direction, and wherein one of the cermet piece diagonal dimensions of each of the studs of the second group extend substantially parallel to the rolling direction.

4. The studded tire of claim 3, wherein one of the cermet piece diagonal dimensions of each of the studs of the first group extend outwardly away from a centerline of the tread in the rolling direction.

5. The studded tire of claim 3, wherein the premade stud holes in the tread comprise a bottom portion having an ovular cross-sectional shape with a larger transversal dimension and a smaller transversal dimension, and wherein the larger transversal dimensions of the stud holes in which studs of the first group are inserted extend substantially parallel to the rolling direction and the larger transversal dimensions of the stud holes in which studs of the second group are inserted extend substantially perpendicular to the tire rolling direction.

6. The studded tire of claim 1, wherein the premade stud holes in the tread have a substantially round cross-sectional shape.

7. The studded tire of claim 1, wherein the premade stud holes in the tread comprise a bottom portion having an ovular cross-sectional shape with a larger transversal dimension and a smaller transversal dimension.

8. The studded tire of claim 1, wherein the body comprises a top bowl spaced-apart from the bottom flange, and wherein the premade stud holes comprise a bottom flange receiving area and a top bowl receiving area, the bottom flange receiving area having a cross-sectional area smaller than a cross-sectional area of the bottom flange, and the top bowl receiving area having a cross-sectional area smaller than a cross-sectional area of the top bowl.

* * * * *